Patented Feb. 21, 1950

2,498,592

UNITED STATES PATENT OFFICE 2,498,592

DAYLIGHT FLUORESCENT PIGMENT COMPOSITIONS

Joseph L. Switzer, Cleveland Heights, and Robert C. Switzer, South Euclid, Ohio

No Drawing. Application January 30, 1945, Serial No. 575,364

24 Claims. (Cl. 252—301.2)

This invention relates to an improvement in luminescent substances, and more particularly, to pigments, coating compositions, and coatings which exhibit the phenomenon termed "daylight fluorescence." This application is a continuation-in-part of our copending applications, Serial No. 414,285, filed October 9, 1941, Serial No. 452,-522, filed July 27, 1942, and Serial No. 455,610, filed August 21, 1942.

As pointed out in the above identified applications, the fluoragents available to the prior art could be classified generally as inorganic fluorescent pigments or organic fluorescent dyes, the term "fluorescent dyes" as employed in this specification and the appended claims being understood to include soluble fluorescent organic dyestuffs, fluorescent intermediates and like fluorescent organics, except unsubstituted hydrocarbons.

Of the two classes of fluoragents, the inorganic pigments, such as the activated metal sulphides, were most widely employed. Such inorganic pigments were far from satisfactory for use in coating compositions, being generally coarse and relatively unstable upon exposure to weathering conditions, as compared with good non-fluorescent pigments. Further, while such inorganic fluorescent pigments possess excellent fluorescent brightness on exposure to fluorescigenous radiations (such as ultraviolet) in the substantial absence of visible light, the colors of such inorganic fluorescent pigments in normal daylight are generally a dull off-shade white or weak pastel tints of green or yellow. [The term "daylight" as used in this specification and appended claims refers to sunlight, or other light having a spectrum containing substantially all of the visible wavelengths of sunlight.]

Due to their poor daylight colors, if any, inorganic fluorescent pigments are generally used in coating compositions only for their ability to luminesce in the substantial absence of visible light. Where such pigments are employed in coating compositions on articles or subject matter which must be viewed in daylight, such coating compositions are generally used mainly as backgrounds in combination with ordinary subtractive coating compositions which supply the contrast and color necessary for daylight viewing. Recent research and synthesis of inorganic fluorescent pigments have improved them as to fineness and resistance to weathering, but efforts to improve their strength or purity of daylight color have been comparatively fruitless and have been pursued with little eventual enthusiasm, due to the apparent antithesis of strong subtractive color, on the one hand, and efficient fluorescence on the other. The failures to obtain pigments having both a strong subtractive color and efficient fluorescence were often excused on the ground that, on the one hand, the theory of fluorescence teaches that the visible light emitted by a fluorescing substance is the reemitted energy of the light of a different color or wave-length which had been absorbed by the fluorescing substance, whereas, on the other hand, the reflection-absorption theory of color teaches that the color of a substance is due to a partial reflection of incident visible light, the unreflected portion of the incident visible light being absorbed and dissipated as heat. Thus, it was expected that the absorptive effect of a pigment having a relatively strong subtractive color would dissipate as heat the incident energy necessary to excite the pigment to fluorescence.

The foregoing conclusion was employed to explain an effect noted in connection with fluorescent dyes. Weak solutions of many dyes known to the prior art were often brilliantly fluorescent and somewhat more tinctorial than inorganic pigments of equal fluorescent brightness. Unfortunately, the notorious fugitiveness, upon exposure to daylight, of such weak concentrations of fluorescent dyes was one of the principal reasons which discouraged their practical use as fluoragents to be used in visible light. Efforts to stabilize such fugitive dyes by usual procedures, i. e., by increasing their concentration or by forming stable metal salts or lakes, either greatly diminished or destroyed their fluorescence. The above conclusion, namely, that a strong subtractive color destroys or diminishes the possibility of fluorescence, still appears to be a valid explanation for the loss or destruction of fluorescence when the above expedients are employed to stabilize dyes which are fluorescent in weak concentrations. As pointed out in our prior application, Serial No. 414,285, we have demonstrated the probable invalidity of another theory which is still often advanced, namely, that fluorescence of organic materials, such as dyes, is a phenomenon associated with the photochemical decomposition of the dyes, similar to the luminescence noted in connection with certain chemical reactions and termed "chemi-luminescence," and thus, if such dyes were rendered light-fast, by increasing their concentration or by forming stable metal lakes, then, according to the theory, fluorescence of the dyes would be prevented because photochemical decomposition of the dyes would be prevented.

It is an object of this invention to provide pigments, coating compositions, and coatings [said compositions and coatings embodying said pigments] which are not only brilliantly fluorescent when exposed to fluorescigenous radiations in the substantial absence of visible light but which are also so bright in color, under daylight, that, in applications where effective purity and brightness of color in daylight is the prime requisite, they are vastly superior to the subtractive colored pigments, coating compositions, and coatings of the prior art.

It is an advantage and startling result of our invention that a coating employing our pigments may project more light of a given color than is present in the visible light incident to such coating; for this phenomenon we have coined the term "daylight fluorescence" in the absence of nomenclature in the prior art. This phenomenon is most strikingly observed in colors which are predominantly of the longer wave-lengths of visible light; for example, red coatings employing our pigments may project as much as 120 to 130% of the light of a corresponding color in the incident visible light. Due to this phenomenon of daylight fluorescence, the colors of our composition are extremely bright and far exceed normal subtractive colors in distinguishability at a distance; due to the fact that our daylight fluorescent compositions can project a disproportionately large amount of light of the dominant waveband, the colors may be exceedingly pure in their total effect. The surprising brightness of coatings containing our pigments may be appreciated when it is realized that a subtractive-colored pigment of the prior art having the same proportional purity and which reflected as much as 60% of the incident visible light in the dominant waveband was heretofore regarded as exhibiting an exceedingly bright and pure color.

So far, and without restricting ourselves to subsequently developed theories, we account for the phenomenon of daylight fluorescence on the theory that, whereas the known subtractive-colored compositions of the prior art exhibited color by virtue of the well-recognized phenomenon of reflecting a greater portion of a wave-band or wavebands in the incident visible light than the other wave-bands in such light and absorbing and dissipating the balance of such light, our compositions exhibit color not only by reflecting a dominant wave-band of the incident visible light but also by emitting a portion of the remaining energy of the incident light as light of the dominant wave-band. To the eye, of course, the reflected light and emitted light is all light of the dominant wave band. Fluorescigenous energy which is converted to fluorescent light is, in many instances, not only invisible untraviolet but also visible light of shorter wave-lengths than the light of the dominant wave-band.

It is a further object of this invention to provide pigments, coating compositions, and coatings which are daylight fluorescent and which are sufficiently stable in daylight and under weathering conditions to permit their use in many practical applications. It is an advantage of our invention that our compositions may be produced in a wide range of colors varying, for example, from blue to red.

Other objects and advantages of our invention will be apparent from the following description of specific examples of our invention and from the appended claims.

In general, we have discovered that we may obtain daylight fluorescent coating compositions and coatings by utilizing as a combined fluoragent and chromogenic agent an organic dye which exhibits color when in solution and which fluoresces in response to long wave or "near" ultraviolet when in a weak solution in a transparent solvent, provided that two further conditions are met:

(a) The concentration of the dye in the solvent must be sufficiently low to prevent substantial dissipation of incident fluorescigenous energy as heat by the dye molecules themselves, and (b) the depth of the solution (with respect to the direction of the incident daylight) must be sufficient to permit the dye to convert and modify an appreciable percentage of the incident daylight transmitted by the transparent solvent for the dye and the transparent vehicle in which the solvent for the dye is dispersed.

The above further conditions were derived from observing that the tinctorial effect of a weak solution of a fluorescent dye could be matched by a still weaker solution of the dye if the depths of the two dye solutions were substantially inversely proportional to the concentrations of the dye in the solutions. It was then discovered that the tinctorial strength of strong, substantially nonfluorescent concentrations of a dye could be equaled by weak fluorescent concentrations of the dye provided that the depths of the two solutions were, again, substantially inversely proportional and the light-diffusing property of the less concentrated (and, consequently, more transparent) solution was properly augmented, as by means of a proper diffusely reflecting background, for example. In short, (b), above, signifies that tinctorial strength is a function of the number of molecules of dye per unit of area of surface covered by the dye. Thus, to obtain both fluorescence and tinctorial strength we (a) limit the concentration of dye to obtain fluorescence and (b) vary the depth of the solution per unit of area of surface covered to obtain the desired tinctorial strength. This last step is in contradistinction to the prior art, which increased tinctorial strength by increasing the concentration of dye. Our limitations are conveniently expressed in terms of (a) grams of pure dye per cubic centimeter of coating and (b) grams of pure dye per square centimeter of surface covered by the coating.

It should be noted that in the foregoing general description of the type of limitations necessary for daylight fluorescence, the dye is described as being in solution, for we have noted that the dyes must be in solution or, if present in a solid, be in a state akin to solution, i. e., the dyes must be solvated. It is also to be noted that the dyes, when limited in terms of grams per unit of measure, are described as pure dyes; many commercial dyes are supplied in a relatively impure state or are diluted or extended. The relative purity of the actual dye employed must be taken into account in compounding daylight fluorescent pigments and coatings within the following limits.

As pointed out in our above identified application, Serial No. 455,610, a peculiarity of daylight fluorescent dyes is that the permissible concentration of dyes decreases as the wave-length of the predominant wave-length of light projected by the solvated dye increases. Likewise, it has been found that the permissible volume of dye per square centimeter of surface being covered decreases as the wave-length of the dominant wave-length of light projected by the solvated dye increases. Thus, for example, the permissible maximum number of molecules of solvated dye per square centimeter of surface covered is less for red daylight fluorescent dyes than for orange daylight fluorescent dyes, less for daylight fluorescent orange dyes than for yellow dyes, and so forth through the spectral colors. A peculiar convenience of expression arises when the dye is specified by weight rather than by number of molecules, because, in general, the molecular weight of dyes capable of exhibiting daylight fluorescence increases as the dominant wave-length of projected light increases in wave-length, thus tending to counterbalance the above stated decrease in permissible volume of dye per unit of area, so that in our daylight fluorescent compositions:

.0005 gram of dye per square centimeter of coating is a practical maximum in any daylight fluorescent system composed of a single dye and a solvating material.

.00006 to .00003 gram of daylight fluorescing dye per square centimeter of surface covered [and at concentrations of less than .01 gram per cubic centimeter of coating] will produce optimum daylight fluorescence.

.000015 gram of daylight fluorescing dye per square centimeter is the minimum amount of dye which will exhibit daylight fluorescence of high chroma or purity of color, although for purposes of tints, no practical minimum has been found, since daylight fluorescent tinting effects have been noted in dilutions exceeding one part of daylight fluorescing dye in many million parts of solvating material.

The effect of the wave-length of the dominant wave-length of light projected is more apparent in connection with the permissible maximum concentration of dye in the solvating material. Thus:

.015 gram per cubic centimeter of solvating material in the final coating is the permissible maximum for red daylight fluorescing dyes.

.025 gram per cubic centimeter of solvating material in the final coating is the permissible maximum for yellow green dyes.

The maximum permissible concentration of dyes of other dominant wave-lengths may be established by extrapolation or interpolation.

The foregoing maxima and minima are given for final coatings on a white background having a diffusing reflectance factor of at least 80% of that of a standard magnesium oxide block. The provision of a background which is an efficient diffusing reflector is of great importance in obtaining maximum brightness and purity of color, as is the provision of a solvating material and/or vehicle which does not absorb appreciable amounts of incident daylight or projected light. Thus dark, turbid, solvating materials are to be avoided; "water-white" solvating materials applied upon a white diffusing background are generally best, though milky-white solvating materials are often excellent where the ingredient causing milkiness is a diffuser rather than an absorber.

It is to be noted further that the foregoing maxima and minima are stated for a single dye in a solvating material. It is often desirable to use a plurality of daylight fluorescing dyes in the same solvating material. In such cases, and where the predominant emission wave-bands of the dyes do not overlap, as in the case of the red dyes and yellow-green dyes, it is possible to use concentrations of each up to its permissible maxima.

When, to obtain maximum intensity of color, it is necessary to use the maximum grams of dye per square centimeter, it is preferable to use the lower values of dye per cubic centimeter of solvating material in the final coating, that is, in short, to use thick coatings in which the dye concentration is very low.

In order to obtain coatings which exhibit the desired daylight fluorescence, it is possible to dissolve the dye in a suitable film-forming vehicle. We prefer to obtain the desired coatings having the necessary amounts and concentrations of daylight fluorescing dyes by pigmented coating compositions. That is, the dyes are dispersed in a suitable, substantially solid, solvating material which will maintain the dyes in a solvated state. The dyed solvating material is then ground to fine pigment size and dispersed in a vehicle, which may include a volatile vehicle solvent, to form a coating composition. The advantages of daylight fluorescent pigmented coating compositions are: First, it permits a wider variety of vehicles to be used and thus provides a wider scope of application while affording the fluorescent stability of hard but fragile thermo-set coatings. Second, better control of dye concentration is obtained; if the dye is merely dissolved in the coating composition vehicle, fluorescence-quenching "skinning" effects may be obtained due to migration and excessive concentration of dye at the surface of the coating during volatilization of solvents in the coating composition. By having the dye dissolved in the pigment rather than in the vehicle, skinning of the coating, no matter how bad, cannot concentrate the dye in excess of a maximum concentration fixed by the concentration of the dye in the pigment.

We have discovered that the proper solvating materials for daylight fluorescing dyes are polymerizable thermo-setting resinous materials in which the dyes will be held in a solvated state when the materials are polymerized. The advantages of such materials are many-fold. Although such thermo-setting resinous materials may vary from tough, horn-like to brittle glass-like materials when polymerized, the fact that such polymerized materials are thermo-setting, rather than thermo-plastic, permits them to be ground to minute pigment-size particles whereas particles of the common thermoplastic material will tend to cohere and "gum up" during grinding. Other excellent pigment characteristics of such materials are that the finely ground powders may be readily dispersed in most coating composition vehicles without flocking and without dissolving; further, such pigments are usually remarkably inert, both with respect to the vehicle and the solvated dye, impervious and stable. Being essentially amorphous, such pigment materials tend to hold the solvated dyes in a homogeneous dispersion throughout a pigment particle, thus enveloping and protecting relatively unstable dyes, rather than tending to throw the dyes out of solution onto the surface of a pigment particle, as in the case of crystalline materials. As pointed out in our application, Serial No. 452,522, unplasticized, unmodified urea-formaldehyde or alcohol-modified urea-formaldehyde resins exert a marked stabilizing effect upon the fluorescent life of daylight fluorescent dyes; these materials are, therefore, generally preferred as carriers for the dyes in our pigments, not only because of the desirable pigment properties of the general class of thermo-setting resins but also because of their remarkable stabilizing effect upon the solvated dyes.

To solvate the dyes in the suitable pigment carrier, one of the following procedures may be employed:

(a) The dye is dissolved in a solution of the unpolymerized resin and a mutual solvent for the resin and dye so that concentration of dye in the resin will not finally exceed the applicable maximum. The resin is then polymerized by heat, alone, or by heat in the presence of a catalytic agent, such as an acid. The polymerized resin is then ground to fine pigment size, preferably until the average size of resin particles ranges between .2 to 2.5 microns, although the size may be larger for use in certain coating compositions which will tolerate coarser pigments, such as, for example, screening lacquers. The dyed resin may be ground dry, or wet, or even in the coating composition vehicle, although dry grinding is generally practiced to permit the pigment particles to be air-classified so that larger particles may be returned to the mill for further grinding. The operativeness of this procedure depends, of course, upon the ability of the dye to withstand the often rigorous conditions of polymerization and grinding and the ability of the resin to hold the dye in a solvated condition.

(b) The undyed resin is polymerized and ground, similarly to the dyed resins above. The dye is dissolved to provide a dye bath in which the concentration of dye may, though not necessarily, exceed the concentration maxima given above. The ground polymerized resin is then dispersed in the dye bath and dyed by the migration of dye from solution in the dye bath to a solvated condition in the resin pigment powder, care being exercised so that the concentration of dye in the pigment particle solvent does not exceed the permissible maxima. The dyed resin pigment particles are then removed from the dye bath and are generally washed and dried, although the washed wet filter cake of pigment may be flushed directly into the coating composition vehicle where the vehicle will preferentially wet the pigment particles. The operativeness of this procedure depends, of course, upon the ability of the poylmerized or hardened resin to solvate the dye. Although unplasticized, unmodified urea-formaldehyde and unplasticized, alcohol-modified urea-formaldehyde, for example, are dense, hard, substantially impervious glass-like materials which show no practical substantivity for the dyes when the resins are polymerized in sheets and bars, nevertheless, it has been found that pigment powders of these materials possess the power of taking up most daylight fluorescent dyes from a dye bath solution. The probable explanation for this phenomenon is that, in so far as the dye in the dye bath is concerned, the resin pigment particles are merely particles of a super-cooled liquid having great solvating power for the dye, the hardness of the particles merely slowing the rate of dye dispersion into the particles, and, because the particles are substantially all surface, the slightest depth of penetration of the pigment particles by the dye will be substantially complete penetration and, thus, the low maximum permissible dye-resin concentration may be reached relatively quickly.

Of the foregoing procedures, the first (a) has the advantage of permitting accurate control of the dye-solvating resin ratio and is, accordingly, recommended when pigments having dye-resin concentrations approaching the permissible maxima are desired. The second (b) has the advantage of permitting the use of dyes which are adversely affected by the conditions of polymerization and also provides a convenient procedure for manufacturing when it is desired to produce small batches of pigments of different colors. It is also to be understood that the above procedures are not limited (a) to the use of completely unpolymerized resins nor (b) to the use of completely polymerized resins; depending upon the degree of polymerization, partly polymerized resins may be dyed either before or after grinding and before complete polymerization. It may even be an advantage to postpone complete polymerization where the pigments are to be used in baking lacquers, molding compositions, or as molding powders per se, to permit polymerization to be completed by the heat employed in subsequent baking or molding operations.

*Selection of coating composition vehicle*

Dry pigments made according to our foregoing procedures usually give no indication whatsoever of the daylight brilliance which they impart to the ultimate coatings. Instead, the dullish, chalky, pastel appearances of the finely ground pigment powders would seem to indicate that these organic fluorescent pigments are similar to many inorganic fluorescent and phosphorescent pigments in that grinding to small pigment size reduces or destroys fluorescence, for our coarser pigments, though still chalky and dull, are less strikingly so. We have discovered, however, that the chalky pastel appearance of our dry pigments is due to the extreme effect of the index of refraction of the solvating carrier for the dye with respect to the air which wets the dry pigment particles and that such chalkiness may be cured by dispersing and wetting the pigments in a coating composition vehicle which has substantially the same refractive index as the carrier of the pigment in which the dye is solvated.

The importance, if optimum results are to be obtained, of selecting a coating composition vehicle having substantially the same refractive index as the refractive index of the solvating dye carrier of our pigment is apparently due to the fact that our pigments owe their color not only to reflected incident light but also to incident fluorescigenous light. Thus, any total reflection due to a difference in the refractive indices of our pigment and its vehicle robs the pigment not only of light which may be reflected but also of fluorescigenous light. Minimum total reflection is obtained, of course, when the indices of refraction of the pigment and vehicle are equal, and it has been observed that no appreciable chalkiness is apparent if the difference in indices of refraction of the pigment and vehicle is less than approximately fifteen per cent of either one; if the difference in indices of refraction is increased more than this extent, the coating composition tends to become chalky.

For optimum brightness, the coating composition vehicle is preferably transparent, not only to visible light but also to near ultraviolet. For optimum fluorescent stability, the coating composition vehicle is preferably completely inert with respect to the pigment. Otherwise the coating composition is selected simply on the basis of the requirements and desiderata of the organic vehicle to be employed in the ultimate coating.

*Preparation of coating compositions and coatings*

As pointed out above, the maximum concentration of solvated dye in the ultimate coating composition is limited by the concentration of solvated dye in the pigment. However, in the ultimate coating, the transparent coating composition vehicle solids are, in a sense, as much of a diluent for the solvated dye as the solvating carrier for the dye in the pigment and must, therefore, be taken into account in the computation of the weight of dye per unit of area and per unit of volume in the ultimate coating. If the ultimate coating, as in a printed or painted area or in a coated fabric or the like, is limited to a maximum permissible thickness, care must be exercised in formulating the coating composition so that the proportion of coating composition vehicle solids is not so great that the minimum amount of dye per unit of area necessary for high chroma or purity of color cannot be obtained in the ultimate coating.

When a coating composition is prepared by dispersing our daylight fluorescent pigments in a transparent vehicle, the composition may be so dark in color (particularly when viewed in a can or other relatively deep vessel) as to give no indication of the extreme brightness and purity of color which may be obtained in the ultimate coating. If so, such darkness will be primarily due to the fact that the depth of the coating is such that the amount of dye per unit of surface area exceeds the permissible maximum; the light reflectance factor of the interior of the vessel will also affect the brightness of the coating composition. It is in such relatively great depths that the effect of differences in transparency of the vehicles and solvating carriers, which may be negligible in the coatings, become pronounced.

For a given coating having a dye concentration within the limits set forth above, the whiteness of the surface on which the coating is applied is a major factor affecting the brightness of the coating. Thus, optimum results are obtained on white surfaces having a reflectance factor (based upon comparison with a standard magnesia block) of eighty per cent or better. If it is not convenient or permissible to employ a white background, the next best background is one having a bright subtractive color similar to that of the dominant wave-band of the coating. Such subtractive-colored backgrounds are generally less desirable than white backgrounds because they are generally less efficient reflectors of the dominant waveband and often absorb incident fluorescigenous light. The coating may, of course, be relatively independent of its background if the coating contains a suspension of diffusely reflecting particles or bodies, or if the surface to which the coating is applied is roughened and the index of refraction between the coating and its supporting surface is such that diffuse total reflection is obtained in that interface; in such instances, the coating, in effect, carries its own diffusely reflecting background.

Generally, our coating compositions comprise a daylight fluorescent pigment dispersed in a liquid vehicle to permit the coatings to be applied to a suitable receiving surface as inks, paints, lacquer-enamels, fabric coating and impregnating compounds which may be applied by customary suitable equipment and procedures, as by brushing, printing, screening, spraying, dipping, roll-coating, knife-coating, and the like. The coatings may cover the entire surface area of the supporting surface or only delineated portions thereof.

Specific illustrative but not limitative examples of daylight fluorescent pigments made according to our invention are as follows:

*Example 1*

| | Parts (by weight) |
|---|---|
| (1) Butyl alcohol-modified urea-formaldehyde solution (50% solids) | 50 |
| (2) 4 amino 1,8 naphthal p-xenylimide | .2 |

The daylight fluorescent dyestuff (2) is dissolved in the resin solution (1) and the dyed resin solution is then polymerized by a suitable procedure, as by heating at 90° C. until jelled, cutting the jell into small pieces and curing at 140–145° C. until the dyed resin is polymerized to a glass-like hardness. (Such curing should be conducted under well ventilated conditions, e. g., in an air circulating oven.) The dyed polymerized resin is then ground until the particles will pass a 200-mesh screen, as by first grinding the material in a hammer mill and then grinding in a pebble mill and passing through an air-classifier which will remove the fines of the desired pigment-particle size and return the coarser particles to the mill for further grinding.

The dye in the pigment made according to this example will be solvated in the polymerized resin carrier at the ratio of .01 grams of dye per cubic centimeter of carrier. When dispersed in a suitable vehicle and applied in a coating of proper thickness on a white surface, this pigment will exhibit brilliant yellow-green fluorescence.

*Example 2*

| | Parts (by weight) |
|---|---|
| (1) Aqueous dispersion of unmodified urea-formaldehyde resin (50% solids) | 100 |
| (2) 4 amino 1,8 naphthal p-xenylimide | .417 |
| (3) Ethyl ester of meta monoethyl aminophenol-phthalein hydrochloride | .0625 |

The dyes (2 and 3) are dissolved in the resin dispersion (1), which is then polymerized and ground by suitable means and procedures, as in Example 1. In the resultant pigment the weight of dye (2) projecting yellow-green light is .0104 gram and of dye (3) projecting red-orange light is .00156 gram per cubic centimeter of solvating resin, the projected light of the two dyes being additive to project a brilliant rich yellow daylight fluorescence when properly dispersed and applied in a coating.

*Example 3*

| | Parts (by weight) |
|---|---|
| (1) Butyl alcohol-modified resin solution (50% solids) | 100 |
| (2) 4 amino 1,8 naphthal p-xenylimide | .6 |
| (3) Meta diethylaminophenol-phthalein hydrochloride | .094 |
| (4) Ethyl ester of meta monoethyl-aminophenol-phthalein hydrochloride | .125 |

The dyes (2, 3, and 4) are dissolved in the resin solution (1) which is then polymerized and ground by suitable means and procedures, as in Example 1. In the resultant pigment the weight of dye per cubic centimeter of solvating resin is .015 gram for the dye (2) projecting yellow-green light, .00235 gram for the dye (3) projecting red light, and .00312 gram for the dye (4) projecting orange-red light, the projected light of the three dyes being additive to produce a brilliant rich orange daylight fluorescence when the pigment is properly dispersed and applied as a coating.

*Example 4*

Parts (by weight)
(1) Alcohol solution of alcohol-modified urea-formaldehyde resin (50% solids) ____ 100
(2) Methyl alcohol _____ 200
(3) Ethyl ester of meta monoethylamino-phenolphthalein hydrochloride _____ 1

The inner solution (1) is polymerized and ground to produce a fine undyed pigment powder, by suitable procedure, as in reducing the dyed resin in Example 1 to a pigment. The dye (3) is dissolved in the alcohol and the solution is heated to a temperature of 40–50° C. Maintaining the dye solution at that temperature, the undyed pigment powder is suitably stirred in the solution until approximately .005 gram of dye per cubic centimeter of resin have been solvated in the pigment powder; the dyed pigment powder is then filtered from the solution, washed and dried. When suitably dispersed and applied in a coating, the pigment exhibits a bright pinkish-salmon daylight fluorescence.

*Example 5*

Parts (by weight)
(1) Succinic anhydride _____ 100
(2) Pentaerythritol _____ 68
(3) Ethylene glycol monomethyl ether ___ 5
(4) Meta diethylaminophenol-phthalein hydrochloride _____ .5

The succinic anhydride and pentaerythritol are mixed and heated in a beaker on a hot plate until the liquid which forms indicates the start of polymerization by becoming viscous. The dye (4) is dissolved in the solvent (3) and the dye solution is added to the resinous carrier (1 and 2). The mixture is then further heated with stirring to thoroughly solvate the dye in the resinous mass and evaporate the dye solvent (3) from the mass. When the mass has become extremely viscous, it is poured into shallow pans and cured at 135–140° C. until very hard. The dyed polymerized mass is then broken out and ground to proper pigment size. The resulting pigment has a dye concentration of approximately .005 gram of dye per cubic centimeter of polymerized thermo-set solvating material. When properly dispersed and applied in a coating, the pigment exhibits an extremely brilliant, rich red daylight fluorescence.

It is to be understood that other polymerized thermosetting resinous materials may be employed for the solvating dye carrier in a like manner to those disclosed in the foregoing examples. Such other materials which have been found suitable for the purposes of this invention include, for example, casein-modified urea-formaldehyde resins, melamine resins, silicone resins (methylated from 1 to 1.9 methyls/silicon), methyl silicols copolymerized with alcohol-modified urea-formaldehyde, and the like. Still other like and probably better dye solvating carrier materials will undoubtedly be discovered in the future.

An example of a coating composition and coatings made according to our invention is as follows:

*Example 6*

Parts (by weight)
(1) Solution of methyl methacrylate (40% solids) _____ 100
(2) Pigment (according to Example 5) _____ 40

The above pigment (2) is thoroughly dispersed in the coating composition vehicle (1) to provide a coating composition which is suitable as a screening lacquer-enamel. In this coating composition the weight of the dye per volume of carrier and vehicle solids will be approximately .0028 gram of dye per cubic centimeter of coating solids. Thus, to provide a coating having optimum daylight fluorescent brightness, the lacquer should be screened upon the coated surface to provide an ultimate coating approximately 6 mils thick; in such thickness the solvated dye will be dispersed at the rate of approximately .000042 gram per square centimeter of surface.

By screening the above lacquer in the thickness given and in large delineated areas upon good white paper and in juxtaposition to large areas printed in a subtractive red, which would normally be considered a bright, rich red, to provide a billboard poster, the extreme brightness of the areas printed with our daylight fluorescent coating will make the areas printed with conventional bright subtractive red inks seem dark and dull by contrast, when the billboard is viewed in daylight. At distances of about one hundred feet or more, the contrast is so great that the areas printed with our pigments actually seem to be augmented by a brilliant source of artificial illumination.

The permutations and combinations of the many pigments which can be made according to our invention and the numerous suitable coating composition vehicles available are such that substantially any desired coating composition and coating may be formulated to meet any particular requirement by those skilled in the art, the requirement for the necessary depth of coating to provide the required weight of dye per unit of area in the ultimate coating excluding, of course, the use of our pigments in ultimate coatings which must be very thin.

Suitable transparent coating composition vehicles which have been found suitable for particular pigments disclosed in Examples 1 to 5, above, include, in addition to the methyl methacrylate given in Example 6, butyl methacrylate, nitrocellulose, nitrocellulose modified by methacrylate resins or by drying or non-drying oil-modified alkyd resins, simple alkyd resins, such as those derived from sebacic acid, urea-formaldehyde suitably modified for use in baking lacquers, and the like. Other suitable vehicles for our pigments will be known to those skilled in the art. As an example of a vehicle which will not afford the optimum utilization of the daylight fluorescence of our pigments, due to an excessive difference in the indices of refraction of the carrier and vehicle, if an orange pigment, as disclosed in Example 3, is dispersed in a fifteen per cent aqueous solution of a vehicle comprised of ammonium caseinate and this coating composition is allowed to dry, then the resulting coating, when viewed in daylight, will be a chalky, pastel pinkish-orange, rather than the rich, brilliant orange obtained when the same pigment is dispersed in a transparent vehicle having a refractive index more closely approximating that of the pigment carrier.

It is to be understood that our coatings are not necessarily dependent upon a diffusely reflecting supporting surface for optimum daylight fluorescent effects. Thus, if our pigment is dispersed in a vehicle which is, in itself, comprised of two or more transparent mediums having sufficient differences in refractive indices to provide a diffuse reflection within the vehicle but not with respect to the dispersed light-modifying pigment, the desired diffuse reflection may be obtained. For example, if forty parts of dinaphthoxy ethane powder is mixed with fifty parts of nitrocellulose dissolved in ethyl acetate and fifty parts of a non-drying oil modified alkyd resin in a toluene solution, such a mixture, when dry, will provide a suitable self-diffusing vehicle for our pigments having an alcohol-modified urea-formaldehyde pigment carrier. Likewise, when our coating is preformed as a cast film, one surface of the film may be etched or abraded to provide a diffusely reflecting surface.

From the foregoing specific examples, it should be apparent that further modifications and variations may be made by those skilled in the art without departing from the scope of our invention as defined in the following claims. In the following claims, it is to be understood that the term "transparent" as applied to the solvating dye carrier and the coating composition vehicle means that the carrier and vehicle are not opaque to either the light projected by the solvated dye or the fluorescigenous light which excites the dye to fluorescence. The term "index of refraction" refers to the index of refraction relative to air. It is also to be understood that the term "dye" refers to pure dye; that when a dye is said to project light of a given color, such color is the dominant wave-band of light projected by the dye; and that the term "dilute solution" means a solution of dye having a concentration of dye not greater than the concentration of dye stated in the claim. It is to be further understood that the term "polymerized carrier" means thermosetting resinous material polymerized to the extent that the material may be crumbled under shearing loads.

What is claimed is:

1. An article comprising a structure having a daylight fluorescent surface area, said area comprised of a layer comprising a dye exhibiting daylight fluorescence when said dye is in dilute solution, solid particles of a transparent polymerized thermo-set resin carrier for said dye dispersed in said layer, said carrier maintaining said dye in a solvated state and said dye retaining its daylight fluorescence when solvated in said carrier, the maximum weight of said dye per volume of carrier varying from substantially .025 gram for dyes projecting yellow-green light to substantially .015 gram of dye per cubic centimeter of solvating carrier for dyes projecting red light and the weight of dye per square centimeter of surface of the article not exceeding .0005 gram of dye for each spectral wave-band of light projected and a transparent resinous vehicle binding said carrier particles together.

2. A daylight fluorescent article as defined in claim 1 in which said layer has a relatively smooth outer surface and an opposite relatively roughened surface to diffuse light entering said coating through said smooth surface.

3. An article comprising a structure having a daylight fluorescent surface area, said area comprising a layer of coating comprising a solvated dye exhibiting daylight fluorescence when in dilute solution, solid particles of a transparent polymerized thermo-set resin carrier for said dye in which said dye is dispersed in a solvated state, and said dye retaining its daylight fluorescence when solvated in said carrier, the maximum proportion of said dye to said carrier varying from substantially .025 gram for dyes projecting yellow-green light to substantially .015 gram for dyes projecting red light per cubic centimeter of solvating carrier, a transparent coating composition vehicle in which said particles are dispersed, the weight of said dye per square centimeter of surface covered not exceeding substantially .0005 gram of dye per square centimeter, and a diffusely reflecting surface covered by said coating.

4. An article having a daylight fluorescent surface coating comprising a solvated dye exhibiting daylight fluorescence when in dilute solution, solid particles of a transparent thermo-set resin carrier having the power to dissolve said dye when said resin is in a liquid state and said dye being dispersed in said carrier in a solvated state and said dye retaining its daylight fluorescence when solvated in said carrier, the maximum proportion of said dye to said carrier varying from substantially .025 gram for dyes projecting yellow-green light to .015 gram for dyes projecting red light per cubic centimeter of solvating carrier, a transparent film of a resinous coating composition vehicle, the maximum difference in indices of refraction of said carrier and said vehicle not exceeding substantially fifteen per cent of the greater index of refraction, said particles of carrier being dispersed in said vehicle, a surface diffusely reflecting light projected by said dye and covered by said coating, the thickness of said coating being proportioned with respect to the amount of dye solvated therein so that the weight of dye per square centimeter of area covered does not exceed .0005 gram.

5. An article as defined in claim 4 in which the amount of dye per square centimeter of surface covered is at least .000015 gram.

6. An article as defined in claim 4 in which the proportion of dye to carrier is less than .01 gram of dye per cubic centimeter of coating and the amount of dye per square centimeter of surface covered varies between .00006 and .00003 gram.

7. An article comprising a structure having a daylight fluorescent surface area, said area comprising a layer of coating comprising a dye exhibiting daylight fluorescence when in dilute solution, solid particles of a thermo-set transparent resin in which said dye is solvated and said dye retains its daylight fluorescence when solvated in said resin, the maximum proportion of dye to resin being substantially .01 gram of dye per cubic centimeter of resin, a transparent coating composition vehicle in which said resin particles, carrying said solvated dye, are dispersed as a pigment, the maximum difference in the indices of refraction of said resin and vehicle being substantially fifteen per cent of the larger index, and a white surface supporting said coating, said coating being of a thickness to provide between .000015 and .00006 gram of solvated dye per square centimeter of surface covered by the coating.

8. An article comprising a structure having a daylight fluorescent surface area, said area comprising a layer of coating comprising a dye exhibiting daylight fluorescence when in dilute solution, solid pigment particles comprised of a solvating polymerized thermo-set resin carrier for said dye, said dye being solvated in said carrier the maximum concentrations being proportional to the wave-length of the dominant wave-length of light projected by said solvated dye and said maximum proportions varying from a maximum of substantially .025 gram for dyes projecting yellow-green light to a maximum of substantially .015 gram for dyes projecting red light per cubic centimeter of carrier and said dye retaining its daylight fluorescence when solvated in said carrier, a transparent vehicle in which said dyed pigment particles are dispersed, a transparent medium in said vehicle having an index of refraction differing from that of said vehicle to impart light-diffusing properties to the coating, the thickness of the coating being proportioned with respect to the ratio of dye to vehicle and carrier solids so that the concentration of dye per square centimeter of surface of the coating does not exceed .0005 gram.

9. An article comprising a structure having a daylight fluorescent surface area, said area comprising a layer of coating comprising a dye exhibiting daylight fluorescence when in dilute solution, solid transparent polymerized thermo-set resin particles bound together in a continuous film, said dye being dispersed in said resin in a solvated state and retaining its daylight fluorescence when solvated in said resin, the proportion of dye to resin being less than .01 gram per cubic centimeter of resin and the thickness of the coating being proportioned with respect to the ratio of dye to the solids of said coating so that the amount of dye per square centimeter of surface of the coating will vary between .00003 and .00006 gram.

10. A daylight fluorescent coating composition comprising a dye exhibiting daylight fluorescence when in dilute solution, solid particles of a polymerized thermo-set resin carrier in which said dye is dispersed in a solvated state and said dye retains its daylight fluorescence when solvated in said carrier, the maximum ratio of dye to carrier being proportional to the wave-length of the dominant wave-length of light projected by the solvated dye and varying from a maximum of substantially .025 gram for dyes projecting yellow-green light to a maximum of substantially .015 gram for dyes projecting red light per cubic centimeter of carrier, and a transparent liquid film-forming coating composition vehicle in which said carrier particles are dispersed.

11. A daylight fluorescent coating composition comprising at least one dye exhibiting daylight fluorescence when in dilute solution, solid pigment particles comprised of a polymerized solvating thermo-set resin carrier for said dye, said dye being solvated in said carrier, the maximum concentrations varying according to the wave-length of the dominant wave-length of the light projected by said dye in the proportions of a maximum of substantially .025 gram for dyes projecting yellow-green light to a maximum of substantially .015 gram for dyes projecting red light per cubic centimeter of solvating carrier and said dye retaining its daylight fluorescence when solvated in said carrier, and a liquid transparent film-forming coating composition vehicle in which said pigment particles are dispersed, the maximum difference in indices of refraction of said carrier and vehicle being substantially fifteen percent of the larger index.

12. A daylight fluorescent coating composition as defined in claim 11 in which said carrier is pulverized, unplasticized polymerized resin of the class consisting of unmodified urea-formaldehyde and butyl alcohol-modified urea-formaldehyde.

13. A daylight fluorescent pigment consisting essentially of a dye exhibiting daylight fluorescence when in dilute solution and a pulverized, transparent polymerized thermo-set resin carrier solid in which said dye is solvated, the maximum ratio of dye to carrier varying according to the wavelength of the dominant wave-length of light projected by said solvated dye in the proportion of a maximum of substantially .025 gram for dyes projecting yellow-green light to a maximum of substantially .015 gram for dyes projecting red light per cubic centimeter of solvating carrier and said dye retaining its daylight fluorescence when solvated in said carrier.

14. A pigment as defined in claim 13 in which the proportion of dye to solvating carrier is less than .01 gram of dye per cubic centimeter of solvating carrier.

15. A pigment as defined in claim 13 in which the solvating carrier is an unplasticized polymerized resin of the class consisting of unmodified urea-formaldehyde and butyl alcohol-modified urea-formaldehyde.

16. A display comprising a support, a daylight fluorescent coating covering at least a delineated portion of the surface of said support, said coating comprising a dye exhibiting daylight fluorescence when said dye is in dilute solution, solid particles of a transparent polymerized thermoset resin carrier for said dye dispersed in said layer, said carrier maintaining said dye in a solvated state and said dye retaining its daylight fluorescence when solvated in said carrier, the maximum weight of said dye per volume of carrier varying from substantially .025 gram for dyes projecting yellow-green light to substantially .015 gram of dye per cubic centimeter of solvating carrier for dyes projecting red light and the weight of dye per square centimeter of surface of the article not exceeding .0005 gram of dye for each spectral waveband of light projected and a transparent resinous vehicle binding said carrier particles together.

17. A display as claimed in claim 16 wherein the proportion of dye to carrier is less than .01 gram of dye per cubic centimeter of composition and the amount of dye per square centimeter of surface covered varies from .00006 and .00003 gram.

18. A display as claimed in claim 16 wherein the amount of dye per square centimeter of surface covered is at least .000015 gram.

19. A display as claimed in claim 16 wherein the thickness of the composition on said support is such as to provide between .00015 and .00006 gram of solvated dye per square centimeter of surface covered by the composition.

20. A display as defined in claim 16, in which the maximum difference in indices of said resinous carrier for said daylight fluorescent dye and said transparent vehicle does not exceed substantially fifteen per cent of the greater index of refraction.

21. A display as claimed in claim 16 in which said transparent vehicle has an index of refraction different from that of said vehicle to impart light diffusing properties to the composition.

22. A display as defined in claim 16, in which said surface of said support reflects light projected by said daylight fluorescent coating.

23. A display as claimed in claim 16 wherein the support comprises paper.

24. A display as claimed in claim 16 wherein the support comprises a fabric.

JOSEPH L. SWITZER.
ROBERT C. SWITZER.

REFERENCES CITED

The following references are of record in the file of this patent:

UNITED STATES PATENTS

| Number | Name | Date |
|---|---|---|
| 1,150,118 | Hewitt | Aug. 7, 1915 |
| 2,037,793 | Jacobson | Apr. 21, 1936 |
| 2,084,526 | Grenier | June 22, 1937 |
| 2,113,090 | McKeag | Apr. 5, 1938 |
| 2,149,993 | Fonda | Mar. 7, 1939 |
| 2,152,856 | Switzer | Apr. 4, 1939 |
| 2,333,329 | Migcarese | Nov. 2, 1943 |
| 2,341,009 | Axelrad | Feb. 8, 1944 |
| 2,360,516 | Schmidling | Oct. 17, 1944 |

OTHER REFERENCES

DeMent, "Flourochemistry," pp. 89–91, Chemical Publishing Co., N. Y. (1945).